(12) United States Patent
Nishi et al.

(10) Patent No.: US 6,880,428 B2
(45) Date of Patent: Apr. 19, 2005

(54) OUTPUT SHAFT STRUCTURE OF SHAFT DRIVEN VEHICLE

(75) Inventors: Tohru Nishi, Saitama (JP); Yoshiaki Hori, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/279,841

(22) Filed: Oct. 25, 2002

(65) Prior Publication Data

US 2003/0131685 A1 Jul. 17, 2003

(30) Foreign Application Priority Data

Oct. 31, 2001 (JP) ........................................ 2001-334526

(51) Int. Cl.$^7$ .............................. F16P 1/00; F16C 3/00; B60K 17/22
(52) U.S. Cl. ...................... 74/606 R; 464/179; 180/376
(58) Field of Search ............................. 74/606 R, 607; 464/179; 180/376

(56) References Cited

U.S. PATENT DOCUMENTS 4,719,819 A * 1/1988 Tsutsumikoshi et al. ...... 74/745
5,199,395 A * 4/1993 Mizumura et al. .... 123/196 AB
5,636,608 A * 6/1997 Shichinohe et al. ...... 123/197.1
6,470,770 B1 * 10/2002 Ito et al. ..................... 74/730.1
6,516,686 B1 * 2/2003 Hori et al. ................. 74/730.1
6,632,144 B1 * 10/2003 Narita et al. ................ 464/179

FOREIGN PATENT DOCUMENTS

JP          2001-74027 A     3/2001

* cited by examiner

*Primary Examiner*—Tisha Lewis
(74) *Attorney, Agent, or Firm*—Birch Stewart Kolasch & Birch, LLP

(57) ABSTRACT

An output shaft structure enabling easy and secure positioning of an output shaft for a shaft driven vehicle having an internal combustion engine. The output shaft structure provides first and second cases which mutually connect on a face perpendicular to a crankshaft and form a crankcase, a case cover attached to the outside of the first case and the output shaft arranged in the crankcases and supported by a first bearing provided to the case cover and a second bearing provided to the first case. Also provided is an input gear for the output shaft arranged so that it touches the outside face of the second bearing. Further, the output shaft is provided with a first large diameter part positioned by touching the inside face of the first bearing, and a second large diameter part positioned by touching the outside face of the input gear.

15 Claims, 2 Drawing Sheets

OUTPUT SHAFT STRUCTURE OF SHAFT DRIVEN VEHICLE

CROSS-REFERENCE TO RELATED APPLICATION

The present application claims priority under 35 U.S.C. §119 to Japanese Patent Application No. 2001-334526, filed on Oct. 31, 2001, the entire contents of which are hereby incorporated by reference.

BACKGROUND OF THE INVENTION

1. Field of the Invention

The present invention relates to the structure of an output shaft for transmitting the output of an engine of a shaft driven vehicle to both the front wheel side and the rear wheel side of the vehicle.

2. Description of Background Art

One example of a structure of the output shaft, is disclosed in Japanese published unexamined patent application No. 2001-74027. The structure is divided into a shaft on the front wheel side and a shaft on the rear wheel side so that they can be separated or connected. The shaft on the front wheel side is supported via a needle bearing, and the shaft on the rear wheel side is supported via a ball bearing and a needle bearing respectively by a crankcase, whereby each shaft can be rotated. The shaft on the rear wheel side of the output shaft is sealed by an oil seal in a rear cover.

In the conventional type output shaft structure, since a bearing support of the output shaft is apart from the oil seal, the run-out of oil around the oil seal of the output shaft becomes large, and the sealing performance of the oil seal is unsatisfactory. Also, since the output shaft is divided into two, the structure is complex, the weight and cost are high, and the assembly is likely to be troublesome.

To solve the problems of the conventional type, a first aspect of the present invention is based upon the output shaft structure of a vehicle driven by shafts of an internal combustion engine and provides first and second cases mutually connected on a face perpendicular to a crankshaft and forming a crankcase, a case cover attached to the outside of the first case and an output shaft arranged in the crankcase and supported by a first bearing provided to the case cover and a second bearing provided to the first case. The output shaft includes a first large diameter part is positioned by touching it to the inside face of the first bearing and a second large diameter part is positioned by touching it to the outside face of the second bearing.

In view of the first aspect of present invention described above, since the output shaft includes the first large diameter part which is positioned by touching it to the inside face of the first bearing and the second large diameter part is positioned by touching it to the outside face of the second bearing, the output shaft can be attached from one direction after the first and second cases are connected. In addition, positioning can be easily and securely made. Also in recombination, a rear crankcase cover has only to be detached, and both assembly workability and maintainability are excellent.

A second aspect of the present invention is based upon the output shaft structure of a vehicle driven by shafts of an internal combustion engine and provides first and second cases mutually connected on a face perpendicular to a crankshaft and forming a crankcase, a case cover attached to the outside of the second case and an output shaft arranged in the crankcase and supported by a first bearing provided to the first case cover and a third bearing provided to the first case. Further, the output shaft includes first and second large diameter parts respectively positioned by touching them to each inside face of the first and second bearings.

In view of the second aspect of the present invention described above, since the first and second large diameter parts are respectively positioned by touching them to each inside face of the first and third bearings, positive effects similar to those achieved with the first aspect of the present invention can be produced.

A third aspect of the present invention is based upon the output shaft structure of a vehicle driven by shafts of an internal combustion engine and provides first and second cases mutually connected on a face perpendicular to a crankshaft and forming a crankcase, first and second case covers respectively attached to each outside of the first and second cases and an output shaft arranged in the crankcase and supported by first and third bearings respectively provided to the first and second case covers. Here again, the output shaft includes first and third large diameter parts positioned by touching them to each inside face of the first and third bearings.

In view of the third aspect of the present invention as described above, since the output shaft includes the first and second large diameter parts which are respectively positioned by touching them to each inside face of the first and third bearings, positive effects similar to those achieved in the first and second aspects the invention can again be produced. In this case, during recombination, the first case cover is detached.

A fourth aspect of the present invention is based upon the output shaft structure of a vehicle driven by shafts of an internal combustion engine and provides first and second cases mutually connected on a face perpendicular to a crankshaft and forming a crankcase, a case cover attached to the outside of the first case and an output shaft arranged in the crankcase and supported by a first bearing provided to the case cover and a second bearing provided to the first case. Also provided is an input gear for the output shaft which is arranged by touching an outside face of the second bearing. Further, the output shaft includes a first large diameter part positioned by touching it to the inside face of the first bearing and a second large diameter part positioned by touching it to the outside face of the input gear.

In view of the fourth aspect of the present invention described above, since the input gear to the output shaft is arranged by touching it to the outside face of the second bearing, and since the output shaft includes the first large diameter part positioned by touching it to the inside face of the first bearing and the second large diameter part positioned by touching it to the outside face of a bearing of the input gear, both the output shaft and the input gear can be easily and securely positioned.

A fifth aspect of the present invention is characterized in that the first bearing is a needle bearing and an oil seal is arranged close to the outside of the needle bearing. Therefore, according to this fifth aspect of the present invention, the run-out of oil from around the output shaft can be inhibited, and the sealing performance of the oil seal is improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
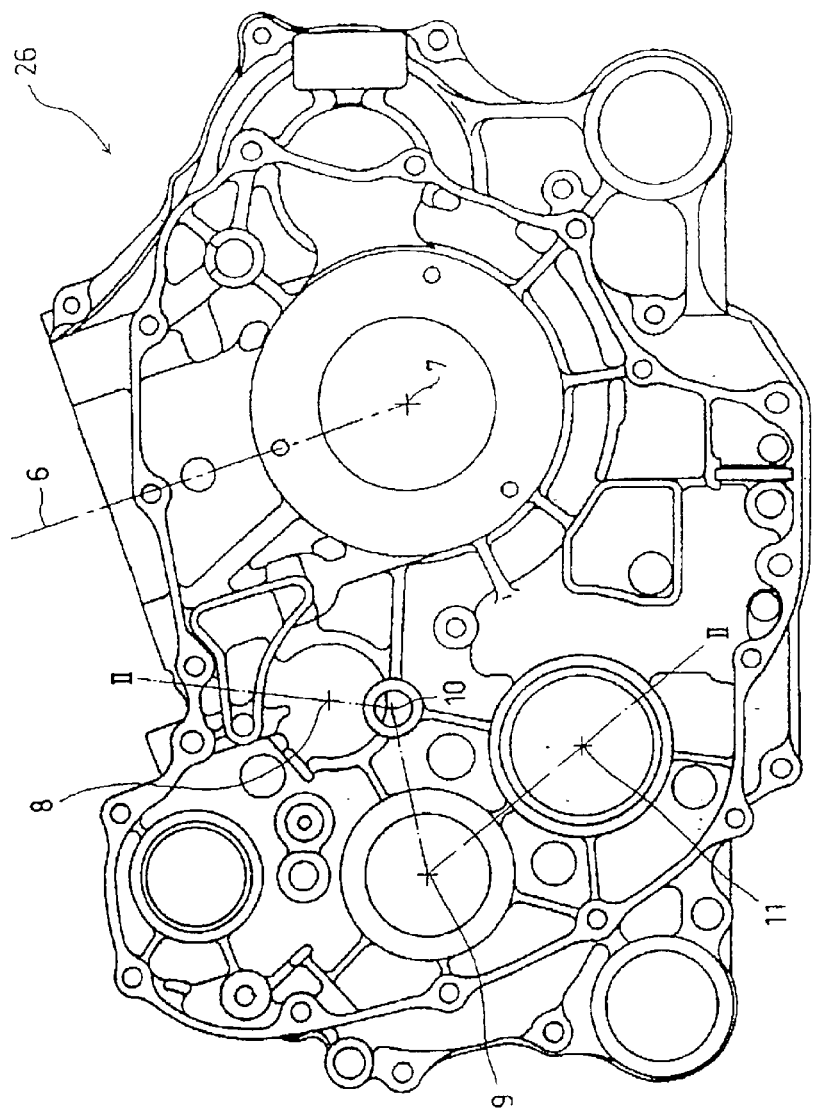
FIG. 1 is a back view (a view substantially viewed along a line I—I in FIG. 2) showing a rear crankcase of an internal combustion engine in one embodiment of the invention.

FIG. 1 is a back view (a view viewed substantially along a line I—I in FIG. 2) showing a rear crankcase 26 of an internal combustion engine in one embodiment of the invention. FIG. 1 shows a crankshaft 7, a main shaft 8 of a transmission, a counter shaft 9, an intermediate shaft 10, an output shaft 11, and the axis 6 of a cylinder.

Figure 2:
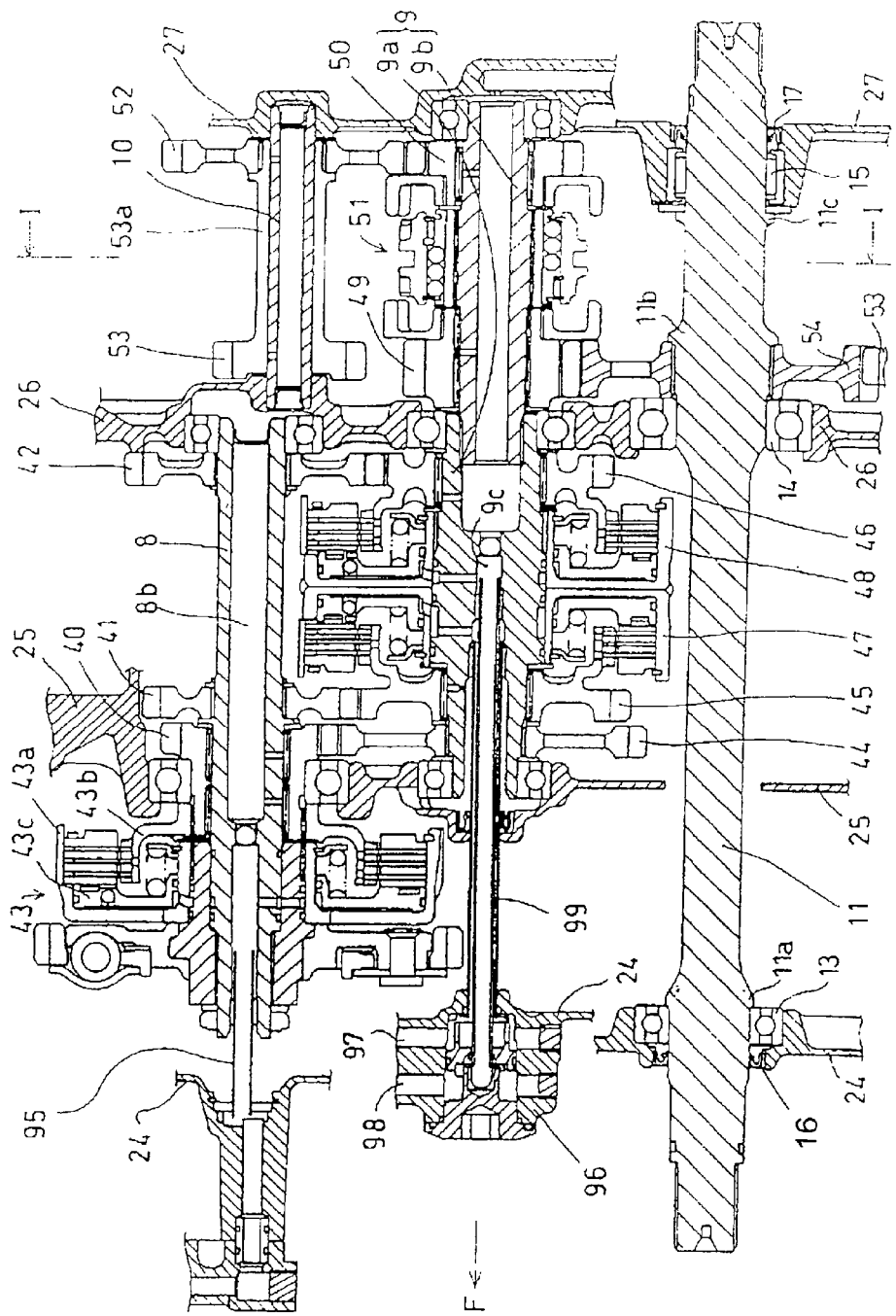
FIG. 2 shows a power transmission mechanism among a main shaft of a transmission, a counter shaft, an intermediate shaft and an output shaft in the embodiment and is a longitudinal section substantially viewed along a chain line II—II in FIG. 1.

Next, FIG. 2 shows a power transmission mechanism among the main shaft 8 of the transmission, the counter shaft 9, the intermediate shaft 10 and the output shaft 11 and is a longitudinal section substantially viewed along a chain line II—II in FIG. 1. In FIG. 2, an arrow F indicates the front.

In this embodiment, a front crankcase 25 and the rear crankcase 26 are mutually connected on a face perpendicular to the crankshaft 7 and the main shaft 8 of the transmission and a crankcase is formed. A front crankcase cover 24 and a rear crankcase cover 27 are attached before and after, that is, outside the front crankcase 25 and the rear crankcase 26.

The main shaft 8 of the transmission is supported by the front and rear crankcases 25 and 26 via a bearing. A first-speed driving gear 40, a second-speed driving gear 41 and a third-speed driving gear 42 respectively different in the number of teeth according to transmission gear ratio are provided to the main shaft 8. The second-speed driving gear 41 and the third-speed driving gear 42 are a fixed gear fixed to the main shaft 8, however, the first-speed driving gear 40 is held via a needle bearing by the main shaft 8 so that the first-speed driving gear can be turned. In the following description, a gear held via a needle bearing so that the gear can be turned around a rotating shaft is called an idle gear.

A hydraulic multiple disc clutch for first speed 43 is provided between the main shaft 8 and the first-speed driving gear 40. For this clutch, a clutch outer 43a is fixed to the main shaft and a clutch inner 43b is connected to the first-speed driving gear 40 which is the idle gear. When hydraulic fluid is supplied between the clutch outer 43a of this clutch and a pressure plate 43c to pressurize them and the pressure plate 43c is moved, the clutch is connected and the first-speed driving gear 40 is fixed to the main shaft 8.

The counter shaft 9 is an integrated counter shaft acquired by connecting a front part 9a and a rear part 9b. The counter shaft 9 is supported by the front crankcase 25, the rear crankcase 26 and the rear crankcase cover 27 respectively via a bearing. A first-speed driven gear 44, a second-speed driven gear 45 and a third-speed driven gear 46 respectively always engaged with the first-speed driving gear 40, the second-speed driving gear 41 and the third-speed driving gear 42 respectively of the main shaft 8 are provided to the front part 9a of the counter shaft 9.

The first-speed driven gear 44 is a fixed gear fixed to the counter shaft, however, the second-speed driven gear 45 and the third-speed driven gear 46 are an idle gear. A hydraulic multiple disc clutch for second speed 47 and a hydraulic multiple disc clutch for third speed 48 are provided between the counter shaft 9 and either of these idle gears. The respective clutch outers of these clutches are fixed to the counter shaft 9 and the respective clutch inners are connected to the idle gears. When hydraulic fluid is supplied between the clutch outer of this clutch and the pressure plate to pressurize them, the pressure plate is moved and the clutch is connected, these idle gears are fixed to the counter shaft 9 and the transmission of power at second or third speed is enabled.

A driving gear for normal rotation 49 and a driving gear for reverse rotation 50 are provided to the rear part 9b of the counter shaft 9. These are both an idle gear, the gear with which a manual dog clutch 51 provided in a medium is engaged is fixed to the rear counter shaft.

An intermediate shaft 10 is supported by the rear crankcase 26 and the rear crankcase cover 27. A first intermediate gear 52 always engaged with the driving gear for reverse rotation 50 and a second intermediate gear 53 connected to the first intermediate gear 52 via a long sleeve 53a are held by the intermediate shaft 10 so that they can be turned.

The output shaft 11 is supported by the front crankcase cover 24, the rear crankcase 26 and a rear crankcase cover 27 via ball bearings 13 and 14 and a needle bearing 15. The output shaft 11 pierces the front crankcase 25 without coming in contact with the front crankcase 25. Further, a driven gear 54 always engaged with the driving gear for normal rotation 49 and the second intermediate gear 53 touches the outside face of the ball bearing 14 and is fixed to the output shaft 11.

This driven gear 54 is normally or reversely driven via the gear with which the dog clutch 51 is engaged and rotates the output shaft 11 in a direction suitable for the forward travel or the backward travel of the vehicle. Therefore, this driven gear 54 functions as an input gear when the gear is viewed from the side of the output shaft 11. Reverse rotation is controlled so that connection is made only when the counter shaft is rotated at first speed.

The gears in the transmission are all constant-mesh gears and it is determined depending upon which clutch of the hydraulic multiple disc clutches 43, 47, 48 is to be connected that any transmission gear ratio is executed. Hydraulic control is made possible by a hydraulic control unit not shown.

That is, hydraulic fluid fed into a fluid passage from the hydraulic control unit toward the hydraulic multiple disc clutch for first speed is fed into a main shaft central hole 8b from the rear face of the front crankcase cover 24 via a pipe 95 for supplying hydraulic fluid and is supplied to the hydraulic multiple disc clutch for first speed 43.

A fluid passage connecting part 96 is provided to a part of the front crankcase cover 24 located on an extended line of the central axis of the counter shaft 9 and fluid passages 97 and 98 toward the hydraulic multiple disc clutch for second speed and the hydraulic multiple disc clutch for third speed are formed. Hydraulic fluid fed from the hydraulic control unit not shown is supplied to the hydraulic multiple disc clutch for second speed 47 or the hydraulic multiple disc clutch for third speed 48 via either of an outside or inside passage of a double pipe for supplying hydraulic fluid 99 from the fluid passage connecting part 96 to a central hole 9c of the counter shaft 9.

Oil seals 16 and 17 are arranged close to the respective outside faces of the ball bearing 13 and the needle bearing 15 on the output shaft 11 and prevent fluid in the crankcase 25 and 26 including the front and rear crankcase covers 24 and 27 from leaking outside. The output shaft 11 includes first large diameter part 11c, second large diameter part 11b, and third large diameter part 11a, these parts touching the inside faces of the needle bearing 15, and the outside face of the driven gear (the input gear) 54, and the ball bearing 13, respectively. The outer diameter of the part having a large diameter 11a is smaller than the inner diameter of the ball bearing 14.

When the output shaft 11 is mounted, the output shaft 11 to which the driven gear (the input gear) 54 is attached is inserted from the rear after the front crankcase cover 24, the front crankcase 25 and the rear crankcase 26 are mutually connected. Then, the output shaft 11 including the driven gear 54 is positioned by the a large diameter part 11a touching the inside face of the ball bearing 13, and the a large diameter part 11b touching the outside face of the driven gear 54 which in turn touches the outside face of the ball bearing 14. Afterward, when the rear crankcase cover 27 is fitted to the rear of the output shaft 11, the large diameter part 11c touches the inside face of the needle bearing 15 and positioning is further secured.

As described above, in this embodiment, after the front crankcase cover 24, the front crankcase 25 and the rear crankcase 26 are connected, the output shaft 11 can be attached from one direction. In addition, positioning of the output shaft and the driven gear 54 can be accomplished easily and securely made. During recombination, the rear crankcase cover 27 has only to be detached, and both assembly and maintenance can be accomplished easily. Further in this embodiment, since the oil seal 17 is arranged close to the outside of the needle bearing 15, the run-out of oil from around the output shaft 11 is inhibited, and the sealing performance of the oil seal 17 is enhanced.

In the embodiment, the output shaft 11 is provided at three locations with large diameter parts 11a, 11b and 11c. However, it is not necessary to have all three of these large diameter parts. Alternatively, only two large diameter parts may be provided, one of which must include the aftermost large diameter part 11c.

For example, the part having a third large diameter 11a touched to the ball bearing 13 is not provided, and only the parts having large diameters 11b and 11c may be also provided. This is equivalent to the fourth aspect of the present invention described above. In this case, a first case is equivalent to the rear crankcase 26, a second case is equivalent to the front crankcase 25 and a case cover is equivalent to the rear crankcase cover 27. A first bearing is equivalent to the needle bearing 15 and a second bearing is equivalent to the ball bearing 14.

On the other hand, when the position of the driven gear (the input gear) 54 is located and a part having a large diameter 11b directly touches the outside face of the ball bearing 14 is provided to the output shaft 11, it is equivalent to the first aspect of the present invention described above.

When a bearing is provided to the front crankcase 25 shown in FIG. 2 and a part having a third large diameter 11a touches the inside face is provided to the output shaft 11, it is equivalent to the second aspect of the present invention. Also in this configuration, a first case is equivalent to the rear crankcase 26, a second case is equivalent to the front crankcase 25 and a case cover is equivalent to the rear crankcase cover 27.

Further, according to the third aspect of present invention, the parts having a large diameters 11a and 11c shown in FIG. 2 are a prerequisite. With this configuration, the existence of both first and second case covers 24,27 and bearings 15,13 provided on the respective case covers are prerequisites of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An output shaft structure of a vehicle driven by shafts of an internal combustion engine, comprising:

first and second cases mutually connected on a face perpendicular to a crankshaft and forming a crankcase;

a case cover attached to the outside of the first case; and an output shaft arranged in the crankcase and supported by a first bearing provided on the first case cover and a second bearing provided on the first case, the output shaft being installed through the crankcase from one direction, wherein the output shaft includes:

a first large diameter part positioned by touching an inside face of the first bearing, and a second large diameter part positioned outside of an outside face of the second bearing, wherein the output shaft pierces the second case without coming in contact with or being supported by the second case.

2. The output shaft structure according to claim 1, wherein:

the first bearing is a needle bearing, and an oil seal is arranged close to the outside of the needle bearing.

3. The output shaft structure according to claim 1, wherein an outer diameter of the first large diameter part is larger than an inner diameter of the first bearing, and an outer diameter of the second large diameter part is larger than an inner diameter of the second bearing.

4. An output shaft structure of a vehicle driven by shafts of an internal combustion engine according to claim 1, wherein the outside face of the second bearing is outside of the crankcase and faces the case cover.

5. An output shaft structure of a vehicle driven by shafts of an internal combustion engine, comprising:

first and second cases mutually connected on a face perpendicular to a crankshaft and forming a crankcase;

a first case cover attached to an outside of the first case a second case cover attached to an outside of the second case; and an output shaft arranged in the crankcase and supported by a first bearing provided to the first case cover and a third bearing provided on the second case cover, the output shaft being installed through the crankcase from one direction, wherein the output shaft includes:

a first large diameter part positioned by touching an inside face of the first bearing, and a third large diameter part positioned by touching an inside face of the third bearing.

6. The output shaft structure according to claim 5, wherein:
the first bearing is a needle bearing, and
an oil seal is arranged close to the outside of the needle bearing.

7. The output shaft structure according to claim 5, wherein an outer diameter of the first large diameter part is larger than an inner diameter of the first bearing, and an outer diameter of the third large diameter part is larger than an inner diameter of the third bearing.

8. An output shaft structure of a vehicle driven by shafts of an internal combustion engine, comprising:
first and second cases mutually connected on a face perpendicular to a crankshaft and forming a crankcase;
first and second case covers respectively attached to each outside of the first and second cases; and
an output shaft arranged in the crankcase and supported by first and third bearings provided to the first and second case covers and a second bearing provided on the second case, the output shaft being installed through the crankcase from one direction,
wherein the output shaft includes:
a first large diameter part positioned by touching an inside face of the first bearing, and
a third large diameter part positioned by touching an inside face of the third bearing,
wherein the output shaft pierces the second case without coming in contact with or being supported by the second case.

9. The output shaft structure according to claim 8, wherein:
the first bearing is a needle bearing, and
an oil seal is arranged close to the outside of the needle bearing.

10. The output shaft structure according to claim 8, wherein an outer diameter of the first large diameter part is larger than an inner diameter of the first bearing, and an outer diameter of the third large diameter part is larger than an inner diameter of the third bearing.

11. An output shaft structure of a vehicle driven by shafts of an internal combustion engine, according to claim 8, wherein the third bearing is mounted on a second case cover attached to the second case.

12. An output shaft structure of a vehicle driven by shafts of in an internal combustion engine, comprising:
first and second cases mutually connected on a face perpendicular to a crankshaft and forming a crankcase;
a case cover attached to the outside of the first case;
an output shaft arranged in the crankcase and supported by a first bearing provided to the case cover and a second bearing provided to the first case; and
an input gear for the output shaft, said input gear arranged so as to touch an outside face of the second bearing,
wherein said output shaft includes:
a first large diameter part positioned by touching an inside face of the first bearing, and
a second large diameter part positioned by touching an outside face of the input gear.

13. The output shaft structure according to claim 12, wherein:
the first bearing is a needle bearing; and
an oil seal is arranged close to the outside of the needle bearing.

14. The output shaft structure according to claim 12, wherein an outer diameter of the first large diameter part is larger than an inner diameter of the first bearing, and an outer diameter of the second large diameter part is larger than an inner diameter of the second bearing.

15. An output shaft structure of a vehicle driven by shafts of an internal combustion engine according to claim 12, wherein the outside face of the second bearing is outside of the crankcase and faces the case cover.

* * * * *